United States Patent
Ager-Wick et al.

(10) Patent No.: US 6,808,650 B1
(45) Date of Patent: Oct. 26, 2004

(54) WATER IMPROVER OF CORAL ALGAE, SHELL SAND AND ASCORBATE SALT

(75) Inventors: Glenn Ager-Wick, Arendal (NO); Einar Ager-Wick, Arendal (NO); Birger Soegaard, Arendal (NO)

(73) Assignee: Health By Nature AS, Vegarsheei (NO)

( * ) Notice: Subject to any disclaimer, the term of this patent is extended or adjusted under 35 U.S.C. 154(b) by 297 days.

(21) Appl. No.: 10/130,879

(22) PCT Filed: Nov. 16, 2000

(86) PCT No.: PCT/NO00/00386

§ 371 (c)(1), (2), (4) Date: Aug. 19, 2002

(87) PCT Pub. No.: WO01/38230

PCT Pub. Date: May 31, 2001

(30) Foreign Application Priority Data

Nov. 26, 1999 (NO) .............................. 995792

(51) Int. Cl.$^7$ ................................. C02F 1/72
(52) U.S. Cl. ............... 252/186.21; 252/186.1
(58) Field of Search .................... 252/186.1, 186.21

(56) References Cited

U.S. PATENT DOCUMENTS 3,890,225 A * 6/1975 Kajiyama .................. 210/688
5,169,682 A   12/1992 Asai ......................... 427/217

FOREIGN PATENT DOCUMENTS

| DE | 3828229 A | * | 2/1990 | |
| EP | 2268885 | | 7/1989 | ........... B29C/47/00 |
| JP | 01180290 A | * | 7/1989 | |
| JP | 1281193 | | 11/1989 | ............. C02F/1/28 |
| JP | 3238088 | | 10/1991 | ............. C02F/3/00 |
| JP | 06206066 A | * | 7/1994 | |
| JP | 6283089 | | 10/1994 | ........... H01H/50/54 |
| JP | 06320150 A | * | 11/1994 | |

OTHER PUBLICATIONS

Chemical abstracts accession No. 1999:450113, Gidas et al., "Performance of chitosan as a primary coagulant for the wastewater treatment," Progress in Water Resources, 1 (Water Pollution IV), 1999, abstract.*

* cited by examiner

Primary Examiner—Robert Sellers
(74) Attorney, Agent, or Firm—Duane Morris LLP

(57) ABSTRACT

The invention pertains to coral sand, more particularly to a composition of coral algae, shell sand and ascorbate being useful as an additive for the improvement of the quality, including the taste, of drinking water, that is as a water improvement agent. The composition is as follows: 5 to 90% coral algae, 5 to 90% shell sand, 0.1 to 8% ascorbic acid salt, and it is chosen so that by the addition of 0.5 g to 1 liter of water is the mixture is emerging with a pH from 7 to 8.5. If the product in addition contains a suitable gelling agent, this entails that any bacteria formerly present, after addition of the water improvement agent according to the invention, no longer exist in the free solution.

7 Claims, No Drawings

WATER IMPROVER OF CORAL ALGAE, SHELL SAND AND ASCORBATE SALT

The present invention relates to a water improvement agent comprising a buffer containing lime and a reducing agent in the form of ascorbic acid salt, where the agent contains at least 0,1% lime ascorbic acid salt and more than 5% dried coral algae as well as possible other components.

Addition of the water improvement agent according to the invention results in fast and efficient elimination of chlorine and leads to an improvement of the taste of the drinking water. A preferred embodiment additionally embraces a gelling agent eliminating free bacteria in the water. The present invention relates to a reducing agent, which, possibly joined by one or more other components, is suitable as an additive for the improvement of drinking water quality, that is, as a water improvement agent.

The taste and quality of the drinking water is of major importance for the health of a population. Vast amounts of public and diverse tap water are consumed either directly or indirectly in the form of nutrients produced by the addition of water. This means that infected water may be a serious source for the propagation of contagious diseases. From the side of the health authorities and waterworks have assured a quality surveillance and treatment of the water. Among other actions an artificial addition of chlorine, possibly in the form of hypochlorite, has been carried out. This treatment may in itself lead to an important sanitary improvement of some aspects of the water quality, while other aspects to some extent may suffer because of this. Particularly it is known that the water may contract an unpleasant chlorine taste. A minor increase in the cancer hazard is also suspected. The possible cancer hazard augmentation may be related to some chlorine species being created as a consequence of the chlorine addition. Allegations concerning other health risks have also been brought forth, without this having won common support by other experts in the art. However, such element of danger cannot be excluded.

From the standpoint of the health authorities the increase in cancer rate is minimal in relation to the massive infection hazard one might face if the chlorine addition would be excluded. Even in specific other countries where the raw water tends to be worse and the chlorine addition consequently bigger, the routine of adding chlorine therefore continues. Thus the ordinary consumer is left with a water quality that probably mostly is rather satisfactory in the terms of the danger of infection. But this water may be handicapped by chlorine taste and possibly in long terms result in an increase in the cancer rate, possibly other health hazard. The latter has apparently lead to some extent of concern among a fragment of the consumers. On this background there is a need for water improvement agents which improve the taste of the drinking water, and possibly also reduce the content of chlorine and possibly dangerous chlorine species. Such additions may for example be applied jointly with the tapping or consumption of the drinking water.

Facing the relatively strict quality control we have in Norway, some danger for the drinking water containing malicious bacteria still remain. This is among other things valid for private wells. Further there is a risk for contamination from unclean water in the water conduits. Also during visits abroad the drinking water represents an infection hazard. We are therefore presented with a need for a water improvement agent, which can also protect against spreading of diseases.

In the consumer market there exists remedies presented as being water improvement additives. Some of these are based upon coral, or rather coral animals, while others appear to be based upon, or to a great extent, contain shell sand. At closer investigation it appears that that those only to some degree, and for a brief time, diminishes the chlorine level. Additionally, this is only valid for free chlorine. As far as known, there is no product available on the market that can eliminate bound chlorine or organically bound chlorine from the drinking water. In order to avoid confusion, and for safeguarding, it shall be mentioned that ionic chlorine—that is $Cl^-$—in this context is regarded as safe. Nor is there existing any product eliminating malicious bacteria from drinking water without adding chlorine or some other reactive component.

Thus there exists a need for a water improvement additive as mentioned above, for use concomitantly with the intake or consumption of tap water.

On this background the present applicant has for several years been experimenting with different compositions of a potential water improvement agent, and has after major effort arrived at a composition of a suitable buffer and a water soluble, reducing compound with a desired elimination of chlorine. One has also attained composition with pleasant taste, smell and appearance.

Among relevant buffers can be mentioned those that are phosphoric acid based. Among available raw materials in nature that can regulate pH in vicinity of neutral, can be mentioned a mixture of coral algae and shell sand. As to reducing agents, in principle both organic as well as inorganic ones may be used. It is however important to avoid metallic taste, colorants and so on. Particularly relevant in this context are those reducing agents (often called antioxidants) which are approved for addition to nutrients. Here referred to listings over "E-substances" that are published by the Governmental Nutrient Control Agency. Among those, particular mention should be made of citrates and lactates, as well as malic acid. A preferred reducing agent is ascorbic acid or a salt, like an alkaline or earth alkaline metal of ascorbic acid—particularly the calcium ascorbate.

The necessary reduction of chlorine and chlorine compounds runs most easily under certain conditions. As to ascorbates, this means that the agent, when it is dissolved in drinking water, should yield a weak basic solution. Further, the reaction rate is influences by the possible presence of trace metals as well as by water-soluble ferric or cupric compounds.

A preferred composition uses a mixture of coral algae, shell sand and ascorbic acid, for example as follows:

5–90% by weight coral algae,

5–90% by weight shell sand, 0,1–10% by weight ascorbate, wherein the percentages by weight are based on the total components in the agent.

Among ascorbates, mention is made of the alkaline or earth alkaline metal salts of ascorbic acid.

The composition can further comprise from 0.2 to 45% by weight of the water improver of a gelling agent such as chitosan which binds bacteria present in the water. About 1.5% by weight of chitosan is preferred. The gelling agent is contained in a water-permeable container such as a teabag wherein the gel remains separated from the water to be consumed.

One aspect by the water improvement agent of the invention is that it improves the taste of drinking water.

Another aspect by the water improvement agent of the invention is that it leads to a fast and efficient elimination of free chlorine, which is hypochlorite and so on.

A further aspect of the present invention is that the water improvement agent stabilizes pH by a correct and for drinking water beneficial value, that is, within the value according to the guideline for drinking water which is settled by the Ministry of Social and Health Affairs.

Another aspect of the present invention, that is a preferred embodiment of it, is that it leads to the elimination of bacteria from the drinking water.

A most relevant aspect of the present invention is that each and all components are completely healthy and safe. Particular, it is interesting that calcium ascorbate by itself is a salt of vitamin C, and thus from a health view completely safe in the relevant amount and to the intended purpose.

Another aspect of the present invention is that the possibly originally moist components of the water improvement agent can be dried and can as a whole be finely milled to a free flowing powder. This will not segregate, as should normally be expected.

Another significant aspect of the water improvement agent is that it is acting fast, so that it normally will have carried out its task before it is consumed.

Another significant aspect of the water improvement agent is that it has an over time stabile composition, as regards pH as well as total chlorine.

A further aspect of the invention is that it only to a minor degree lifts pH to above neutral level.

One aspect of the invention is that it is not based upon coral animals, but rather upon coral algae. Those have valuable properties seen from the standpoint of a vegetarian.

In the present description some technical terms are being employed. This pertains for example to:

active chlorine free chlorine bound chlorine total chlorine.

All 4 expressions are being employed herein according to the definitions of ND 4729.

In the following the water improvement agent according to the invention is being termed water improvement agent A.

By comparative examinations of the water improvement agent according to the invention and water improvement agents available on the market, it has been demonstrated that the water improvement agent A has a superior ability to eliminate chlorine. The actual analyses have been executed in our laboratory. By analysis of chlorine a method according to NS 4729 was employed. The method and results are presented below.

EXAMPLE 1

Small Test of the Potential of Three Different Lime Products of Affecting Acidity and Chlorine Content in Drinking Water Materials and Method To water from a public waterworks a little extra sodium hypochlorite was added. To this were added three different lime products in amounts according to what was stated on the package. Chlorine content and pH was measured before addition an after 1, 4 and 18 hours. The lime products were as supplied the customer in sealed packages, and were of the type MPG, Norsk Korallsand and water improvement agent A1 (the latter is identical with the water improvement agent according to the invention). The lime was not eliminated from the water, as indicated by some manufacturers.

Water improvement agent A1 had the following composition: 2.75% by weight calcium ascorbate, 7–8% by weight shell sand. The rest was made up of coral algae.

Employed amounts were:

MPG 1 bag per liter of water.

Norsk Korallsand: 1 heaped metering spoon per 2.5 liter of water=0.6 grams per liter.

Water improvement agent A1 (that is, according to the invention): 1 flat metering spoon per 2 liters=0.5 grams per liter.

Results

| Product: | Before addition | After 1 hour | After 4 hours | After 18 hours |
|---|---|---|---|---|
| Acidity - pH: | | | | |
| MPG | 7,72 | 9,41 | 9,38 | 9,65 |
| Norsk Korallsand | 7,72 | 8,46 | 8,52 | 9,18 |
| Water improvement agent A1* | 7,69 | 7,97 | 7,84 | 7,92 |
| Total chlorine in mg/l: | | | | |
| MPG | 0,21 | 0,10 | 0,13 | 0,05 |
| Norsk Korallsand | 0,21 | 0,15 | 0,15 | 0,06 |
| Water improvement agent A1* | 0,21 | 0,00 | 0,00 | 0,00 |
| Free chlorine in mg/l: | | | | |
| MPG | 0,14 | 0,10 | 0,10 | 0,04 |
| Norsk Korallsand | 0,14 | 0,05 | 0,05 | 0,00 |
| corai sand* | 0,11 | 0,00 | 0,00 | 0,00 |

*According to the invention.

Brief Evaluation of Test Results

Acidity—pH—

All three products do increase the pH value of the water, water improvement agent A1 to the highest extent. For water improvement agent A1 pH first increases, and later drops.

Content of Total Chlorine, Free Chlorine

Subsequent to the addition of the lime product, that is water improvement agent, a reduction of the chlorine content of the water is seen for all three products. Here, it should be noted that chlorine added to drinking water is unstable and will disappear by itself. The smallest reduction of chlorine content is found in the sample where Norsk Korallsand was added, most reduction was found in the sample of water improvement agent A1, that is in the sample according to the present invention. The latter seems to eliminate chlorine totally and spontaneously.

EXAMPLE 2

Small Test of Drinking Water with Added Intestinal Bacteria, with and without Water Improvement Agent A2

This test was performed according to NS 4792. A preferred embodiment with an addition of 1.50% by weight chitosan and 0.50% by weight methyl cellulose, in the following called water improvement agent A2, was employed. The content of coral algae was reduced accordingly. The test was performed with 4 samples of public tap water. To one and the same sample bacteria were first added, and they were counted. Then was added 1 "teabag" containing water improvement agent A2, the sample was mixed thoroughly, and given time to work in 1 hour. The results are listed up in the following table, where the number of bacteria relates to 100 ml.:

| Sample | number of bacteria |
|---|---|
| Public tap water, without coral sand | 1500 |
| Public tap water, with coral sand | 0 |
| Public tap water, without coral sand | 1500 |

-continued

| Sample | number of bacteria |
|---|---|
| Public tap water, with coral sand | 0 |
| Public tap water, without coral sand | 1500 |
| Public tap water, with coral sand | 0 |
| Public tap water, without coral sand | 1000 |
| Public tap water, with coral sand | 0 |

From the results it is evident that coral sand with gelling agent according to the invention drastically reduces the content of intestinal bacteria in the public tap water. One may assume that this is related to the bacteria, after the mixing, are caught up by the gel, and thereby continues to stay within the teabag together with the other insoluble components of the agent. The applicant does not want to be bound by this assumption, but has observed that a number of gel forming agents to a smaller or greater extent is reducing, even eliminating, bacteria in the water.

For professionals within the art it should be evident that many variations can be constructed on the basis of this description and the above examples, without this adding anything new to the invention, as it is limited in the following claims.

What is claimed is:

1. Agent for improvement of drinking water, based upon a calcareous buffer as well as a reducing agent in form of an ascorbic acid salt, characterized in that it comprises:

5 to 90% by weight coral algae,
   5 to 90% by weight shell sand, and
   0.1 to 10% by weight ascorbic acid salt,
   wherein the percentages by weight are based on the total components in the agent.

2. Agent according to claim 1, characterized in that a composition of the agent is chosen so that the pH by of 0.5 g to 1 liter of drinking water becomes between 7 and 8.5.

3. Agent according to claim 1, characterized in that it comprises 1 to 8% calcium ascorbate.

4. Agent according to claim 1, characterized in that it comprises trace metals as well as water-soluble ferric or cupric compounds.

5. Agent according to claim 1, characterized in that it further comprises 0.2 to 45% by weight gelling agent functioning by that in the water it is binding bacteria, and by that the agent or at least to gelling agent is contained in a container being water permeable, but still keeping the gel separated from the water that is to be consumed.

6. Agent according to claim 5, characterized in that the gelling agent is chitosan and the container is shaped as a teabag.

7. Agent according to claim 5, characterized in that it comprises about 1.5% by weight chitosan.

* * * * *